(12) United States Patent
Ma et al.

(10) Patent No.: US 9,531,934 B2
(45) Date of Patent: *Dec. 27, 2016

(54) PHOTOGRAPHING DEVICE WITH ROTATABLE ELECTRICAL CONNECTION PORTION

(71) Applicant: VIVOTEK INC., New Taipei (TW)

(72) Inventors: Shyh-Yih Ma, New Taipei (TW);
Jen-Chih Wu, New Taipei (TW);
ChaoTan Huang, New Taipei (TW)

(73) Assignee: VIVOTEK INC., New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/080,218

(22) Filed: Mar. 24, 2016

(65) Prior Publication Data
US 2016/0205303 A1    Jul. 14, 2016

Related U.S. Application Data

(63) Continuation of application No. 14/325,778, filed on Jul. 8, 2014, now Pat. No. 9,332,168.

(30) Foreign Application Priority Data

Aug. 7, 2013 (TW) .............................. 102128354 A

(51) Int. Cl.
*H04N 5/225* (2006.01)
*G08B 13/196* (2006.01)
*H04N 5/33* (2006.01)

(52) U.S. Cl.
CPC ........ *H04N 5/2258* (2013.01); *G08B 13/1963* (2013.01); *H04N 5/2251* (2013.01); *H04N 5/332* (2013.01)

(58) Field of Classification Search
CPC ............. H04N 5/2251–5/2254; H04N 5/2258; H04N 5/332; G08B 13/19617–13/19632
See application file for complete search history.

(56) References Cited

U.S. PATENT DOCUMENTS

| | | | |
|---|---|---|---|
| 9,332,168 B2* | 5/2016 | Ma ....................... | H04N 5/2258 |
| 2011/0085036 A1* | 4/2011 | Kong ................... | H04N 5/2251 |
| | | | 348/143 |

(Continued)

FOREIGN PATENT DOCUMENTS

WO    2008079862 A1    7/2008

*Primary Examiner* — Dennis Hogue
(74) *Attorney, Agent, or Firm* — Maschoff Brennan

(57) ABSTRACT

A photographing device includes a main body, a first video capturing unit, a second video capturing unit and a rotatable electrical connection portion. The first video capturing unit is disposed on the main body, a center of a first video capturing range of the first video capturing unit is located on a first axis. The second video capturing unit is rotatable about the first axis to be pivoted on the main body, the second video capturing unit and the first axis are separated by a distance. A second video capturing range of the second video capturing unit overlaps the first axis. The rotatable electrical connection portion includes a first and a second connection component pivoted and connected to each other. The second video capturing unit is disposed on and connected to the first connection component. The second connection component is disposed on and connected to the main body.

7 Claims, 14 Drawing Sheets

(56) References Cited

U.S. PATENT DOCUMENTS

2012/0206604 A1\* 8/2012 Jones .................. H04N 5/2251
348/159
2012/0257064 A1\* 10/2012 Kim ................. G08B 13/19626
348/159

\* cited by examiner

PHOTOGRAPHING DEVICE WITH ROTATABLE ELECTRICAL CONNECTION PORTION

CROSS-REFERENCE TO RELATED APPLICATIONS

This application is a continuation application of U.S. patent application Ser. No. 14/325,778, filed on Jul. 8, 2014, which claims priority under 35 U.S.C. §119(a) on Patent Application No(s). 102128354 filed in Taiwan, R.O.C. on Aug. 7, 2013, the entire contents of which are hereby incorporated by reference.

BACKGROUND

Technical Field

The disclosure relates to a photographing device, and more particularly to a photographing device having multiple video capturing units.

Related Art

In photographing technology, some kinds of lens assembly, such as a fish-eye lens or a wide-angle lens, may capture a wider image than common lens assemblies. However, these kinds of images have disadvantages of distortion in periphery region, being hard to zoom-in and lower resolution. For example, when this kind of lens assembly is utilized in a surveillance camera and a user or a surveillance software observes or detects a suspicious object so that the user or the software wants to zoom-in a portion of the field of view, the image may be distorted and its resolution may be too low to show a clear image. Especially when a portion of the field of view in a periphery region thereof needs to be zoomed-in, the distortion and unclear of the image are getting worse.

Although some manufactures develop an auxiliary lens assembly for assisting the main lens assembly (the fish-eye lens or the wide-angle lens) to capture the image which needs to be zoomed-in, a part of the viewing angle of the auxiliary lens assembly may be obscured by the main lens assembly.

In prior art, Patent WO2008079862 discloses a feature that an auxiliary lens assembly disposed away from above the main lens assembly on a track such that the viewing angle of the auxiliary lens assembly may not be obscured by the main lens assembly. However, WO2008079862 does not disclose when the auxiliary lens assembly spins several revolutions, how to deal the problem that if cables were connected to the auxiliary lens assembly, the cables may be tangled, even being snapped.

SUMMARY

One aspect of the disclosure provides a photographing device comprising a main body, a first video capturing unit, a second video capturing unit and a rotatable electrical connection portion. The first video capturing unit is disposed on the main body, and a center of a first video capturing range of the first video capturing unit is substantially located on a first axis. The second video capturing unit is pivotally disposed on the main body for being rotatable about the first axis, the second video capturing unit and the first axis are separated by a distance, and a second video capturing range of the second video capturing unit overlaps at least a portion of the first axis. The rotatable electrical connection portion includes a first connection component and a second connection component that are pivoted and electrically connected to each other. The second video capturing unit is disposed on and electrically connected to the first connection component, and the second connection component is disposed on and electrically connected to the main body.

Another aspect of the disclosure provides a photographing device comprising a main body, a first video capturing unit, a second video capturing unit, a first rotatable electrical connection portion and a second rotatable electrical connection portion. The first video capturing unit is disposed on the main body, and a center of a first video capturing range of the first video capturing unit is substantially located on a first axis. The second video capturing unit is pivotally disposed on the main body for being rotatable about the first axis, the second video capturing unit and the first axis are separated by a distance, and a second video capturing range of the second video capturing unit overlaps at least a portion of the first axis. The first rotatable electrical connection portion includes a first connection component and a second connection component that are pivoted and electrically connected to each other, and the first video capturing unit is disposed on and electrically connected to the first connection component. The second rotatable electrical connection portion includes a third connection component and a fourth connection component that are pivoted and electrically connected to each other. The second connection component is affixed and electrically connected to the third connection component, the second video capturing unit is disposed on and electrically connected to the second connection component or the third connection component, and the fourth connection component is disposed on and electrically connected to the main body. One of the first connection component and the second connection component comprises a brush, and the other one of the first connection component and the second connection component comprises a current collector. One of the third connection component and the fourth connection component comprises a brush, and the other one of the third connection component and the fourth connection component comprises a current collector.

BRIEF DESCRIPTION OF THE DRAWINGS

The present invention will become more fully understood from the detailed description given hereinbelow and the accompanying drawings which are given by way of illustration only and thus are not limitative of the present invention and wherein.

DETAILED DESCRIPTION

Figure 1A:
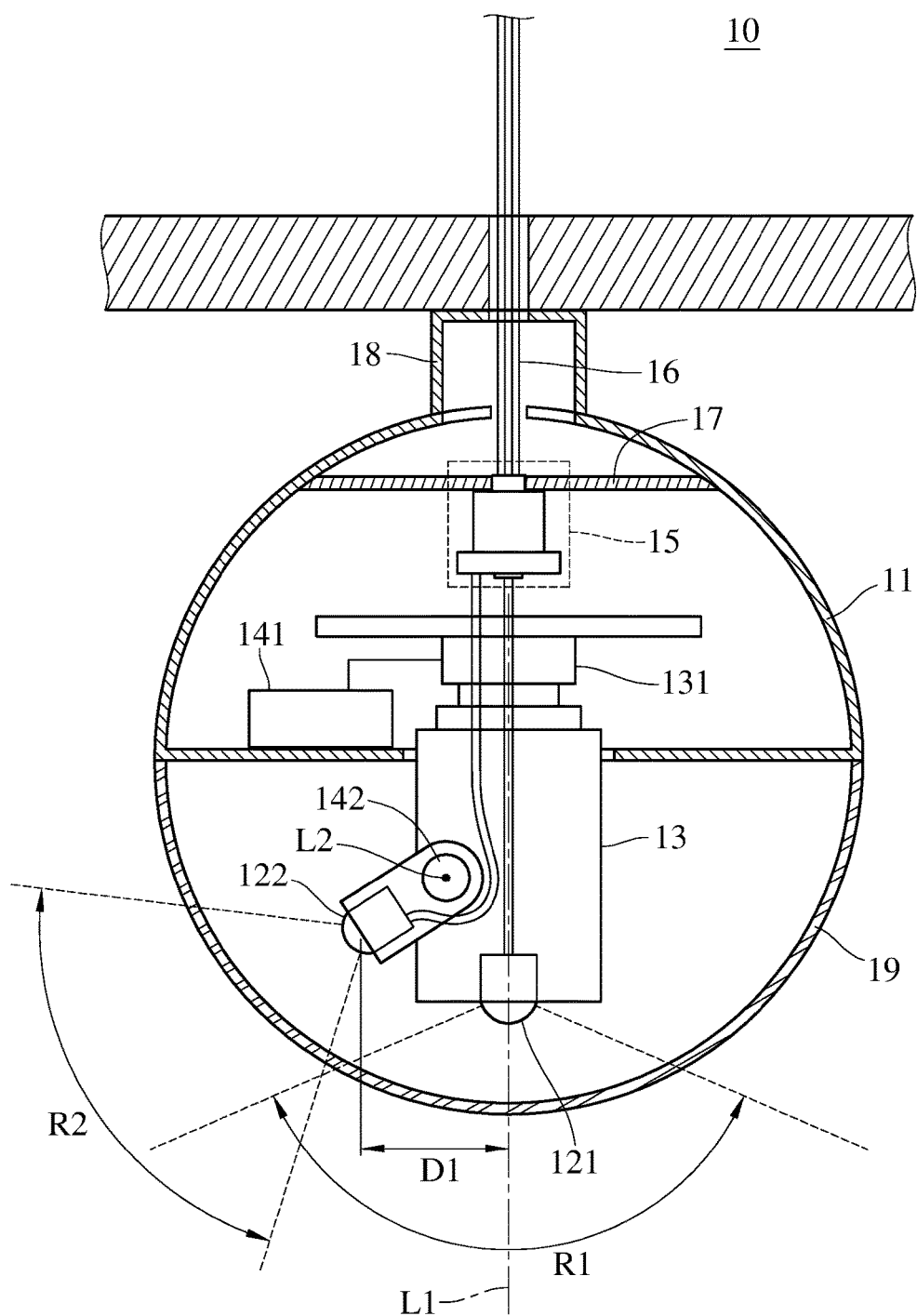
FIG. 1A is a cross-sectional side view of a photographing device according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Please refer to FIG. 1A, which is a cross-sectional side view of a photographing device 10 according to an embodiment of the disclosure. In this embodiment, the photographing device 10 comprises a main body 11, a first video capturing unit 121, a second video capturing unit 122, a holder 13, a main body 131, a first driving module 141, a second driving module 142, a connection assembly 15, a plurality of cables 16, a fixation bracket 17, an installation component 18 and a shield 19.

The first video capturing unit 121 is disposed on the main body 11. A center of a first video capturing range R1 of the first video capturing unit 121 is substantially located on a first axis L1. The second video capturing unit 122 is pivotally disposed on the main body 11 for being rotatable about the first axis L1, and a surface of a lens of the second video capturing unit 122 and the first axis L1 are separated by a distance D1, and the distance D1 is varied according to the position of the second video capturing unit 122. Consequently, the second video capturing unit 122 is located above the first video capturing unit 121 but not on the upright position of the first video capturing unit 121 such that when the second video capturing unit 122 captures an image below, the first video capturing unit 121 may not obscure, block or interfere with the image capturing by the second video capturing unit 122. Moreover, a second video capturing range R2 of the second video capturing unit 122 overlaps at least a portion of the first video capturing range R1, and images captured in the first video capturing range R1 and the second video capturing range R2 which are overlapped may be zoomed-in (enlarged) because of the image capturing by the second video capturing unit 122.

In this disclosure, a video capturing range is defined as a field of view where a video capturing unit may capture.

The holder 13 is pivotally disposed on the main body 11 for being rotatable about the first axis L1. The second video capturing unit 122 is pivotally disposed on the holder 13 for being rotatable about a second axis L2, and the second video capturing unit 122 is also pivotally disposed on the main body 11 through the holder 13 for being rotatable about the first axis L1. A direction of the first axis L1 is perpendicular to but not intersected with a direction of the second axis L2.

When the holder 13 rotates (i.e., spins) about the first axis L1 relative to the main body 11, the second video capturing unit 122 rotates about the first axis L1 along with the holder 13 relative to the main body 11. Please refer to FIG. 1B, which is a cross-sectional side view of the photographing device in FIG. 1A when a second video capturing unit rotates. The second video capturing unit 122 is capable of being rotatable about the second axis L2 relative to the holder 13. Furthermore, the rotation of second video capturing unit 122 also allows the second video capturing range R2 to overlap at least a portion of the first axis L1. The distance D1 in FIG. 1A is shortened to a distance D1'. Thus, take a center of an image captured by the first video capturing unit 121 as a center of a circle. A direction from the center to a circumference of the circle is defined as a radial orientation, another direction which is rotating about the center of the circle is defined as a rotational orientation, and the first axis L1 penetrates through the center of the circle. The second video capturing unit 122 is capable of being rotatable about the first axis L1 to capture each and every image captured by the first video capturing unit 121 in every rotational orientation. The second video capturing unit 122 is capable of being rotatable (being tilting) about the second axis L2 to capture every image from every radial orientation. As a result, the second video capturing unit 122 is capable of capturing each and every image captured by the first video capturing unit 121 and there is no any blind spot in the image captured by the second video capturing unit 122.

The first driving module 141 is disposed on the main body 11 and capable of driving the second video capturing unit 122 to rotate (i.e., spin) about the first axis L1. The second driving module 142 is capable of driving the second video capturing unit 122 to rotate (i.e., tilt or pivot) about the second axis L2. The first driving module 141 may also drive the holder 13 to rotate (spin) about first axis L1 relative to the main body 11 so as to drive the second video capturing unit 122 to rotate about the first axis L1 relative to the main body 11 as well.

The connection assembly 15 is located on the first axis L1. The first video capturing unit 121 and the second video capturing unit 122 are electrically connected to the main body 11 via the connection assembly 15. The fixation bracket 17 is affixed to the connection assembly 15 and the main body 11 such that the first video capturing unit 121 may not rotate (i.e., spin) relative to the main body 11 (discussed further below). The installation component 18 is installed on the main body 11, and the main body 11 may be installed at a desired location, such as ceiling, wall or table, through the installation component 18. The shield 19 is disposed on the main body 11 and covers the first video capturing unit 121, the second video capturing unit 122, the holder 13, the first driving module 141, the second driving module 142, the connection assembly 15, the plurality of cables 16 and the fixation bracket 17.

In this embodiment, the first video capturing range R1 is greater than the second video capturing range R2 which may be varied. The first video capturing unit 121 may comprise a fish-eye lens or a wide-angle lens. The second video capturing unit 122 is capable of panning, tilting and zooming (i.e., PTZ). Thus, the photographing device 10 in this disclosure may utilize the first video capturing unit 121 to capture a panorama image or a wide-angle image. When a portion of this panorama or wide-angle image needs to be zoomed-in (i.e., being magnified), the first driving module 141 is utilized to drive the second video capturing unit 122 to rotate (i.e., spin) about the first axis L1 to the position corresponding to the portion of the image along the rotational orientation. Also, the second driving module 142 is utilized to drive the second video capturing unit 122 to rotate (i.e., tilt) about the second axis L2 to the position corresponding to the portion of the image along the radial orientation. As a result, the target image (the portion of the image needs to be magnified) is located within a center portion of the second video capturing range R2 of the second video capturing unit 122. Then, the second video capturing unit 122 performs zoom-in, and therefore the captured image becomes the desired image (the image which is desired to be magnified). When the second video capturing range R2 is reduced, the image which the second video capturing unit 122 captures is magnified; when the second video capturing range R2 is increased, the image which the second video capturing unit 122 captures is minified.

Figure 2A:
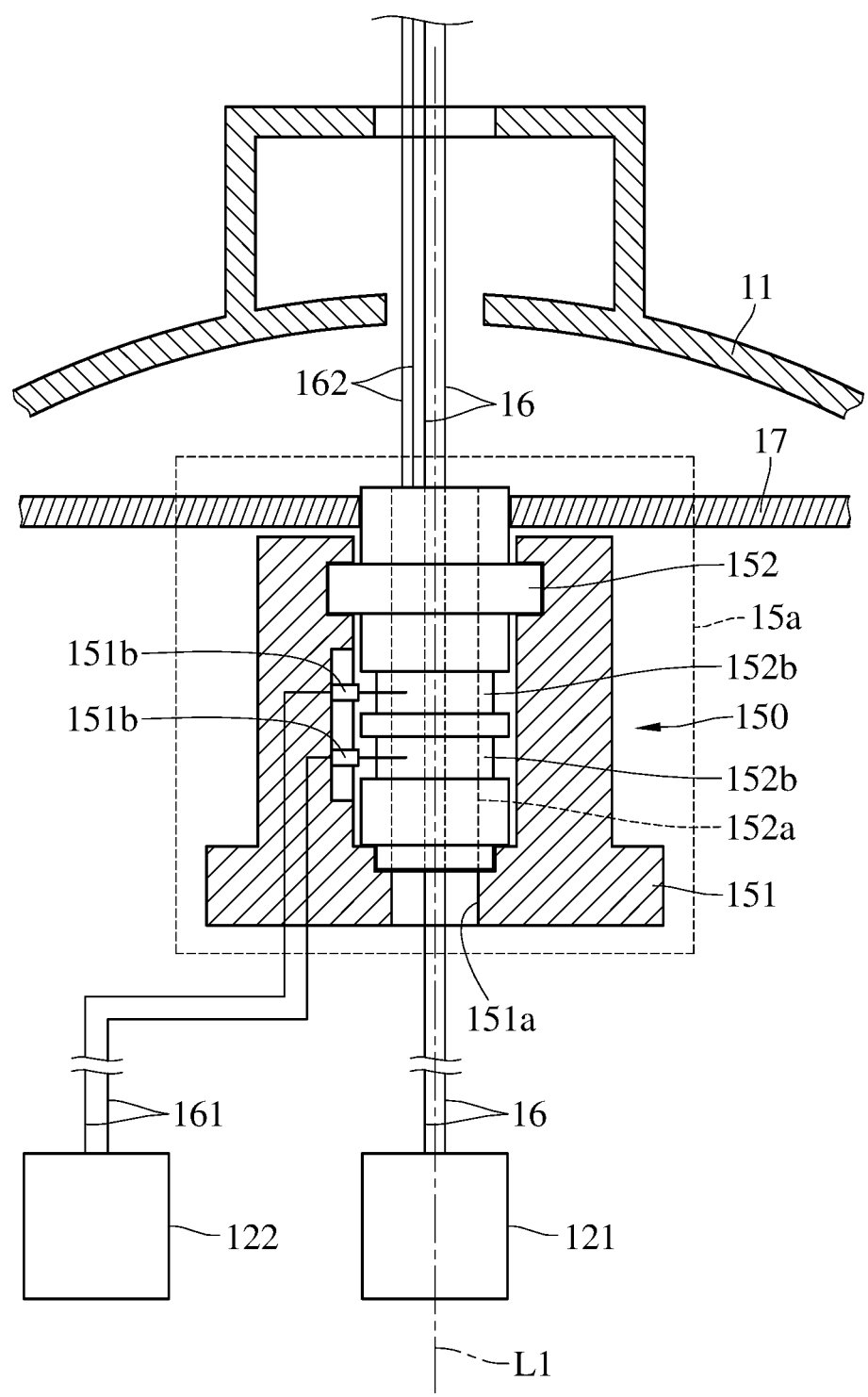
FIG. 2A is a cross-sectional side view of a connection assembly of the photographing device according to a first embodiment of the disclosure.

Please refer to FIG. 2A, which is a cross-sectional side view of a connection assembly 15a of the photographing device 10 according to a first embodiment of the disclosure. In this embodiment, the connection assembly 15a includes a rotatable electrical connection portion 150. The rotatable electrical connection portion 150 includes a first connection component 151 and a second connection component 152 that are pivoted and electrically to each other. The first connection component 151 is pivotally disposed on the second connection component 152 for being rotatable about the first axis L1. The second video capturing unit 122 is disposed on and electrically connected to the first connection component 151. The second connection component 152 is disposed on and electrically connected to the main body 11. The first connection component 151 includes a first through hole 151a, and the second connection component 152 includes a second through hole 152a. The cables 16 penetrate through the first through hole 151a and the second through hole 152a in sequence. One end of the cable 16 is electrically connected to the first video capturing unit 121, and the other end of the cable 16 is electrically connected to the main body 11. The connection assembly 15a further comprises a housing which is affixed to the second connection component 152, and the fixation bracket 17 is affixed to the housing of the connection assembly 15a. Although the cable 16 is not in direct contact with the connection assembly 15a, the second connection component 152 which is fixed by the fixation bracket 17 prevents the connection assembly 15a from detaching to fall. However, the disclosure is no limited to the above-mentioned fixation of the connection assembly 15a and the fixation bracket 17.

The first connection component 151 comprises a plurality of brushes 151b, and the second connection component 152 comprises a plurality of current collectors 152b. Some of the cables 161 electrically connected to first connection component 151 and second video capturing unit 122 are electrically connected to the brushes 151b of the first connection component 151, respectively. Some other cables 162 electrically connected to the second connection component 152 and the main body 11 are electrically connected to the current collector 152b of the second connection component 152, respectively. The first connection component 151 may rotate (i.e., spin) about the first axis L1 along with the second video capturing unit 122. The first connection component 151 and the second connection component 152 are in electrical contact with each other via the brushes 151b and the current collector 152b, such that the first connection component 151 may still be electrically connected to the second connection component 152 when spinning along with the second video capturing unit 122 about the first axis L1. By the above-mentioned configuration, the first video capturing unit 121 is electrically connected to the main body 11 via the cables 16 penetrating through the first through hole 151a of the first connection component 151 and the second through hole 152a of the second connection component 152. The second video capturing unit 122 is electrically connected to the main body 11 via the electrical connections of the brushes 151b of the first connection component 151 and the current collectors 152b of the second connection component 152. The second driving module 142 in FIG. 1A is electrically connected to the main body 11 via the similar route of the second video capturing unit 122.

Figure 2B:
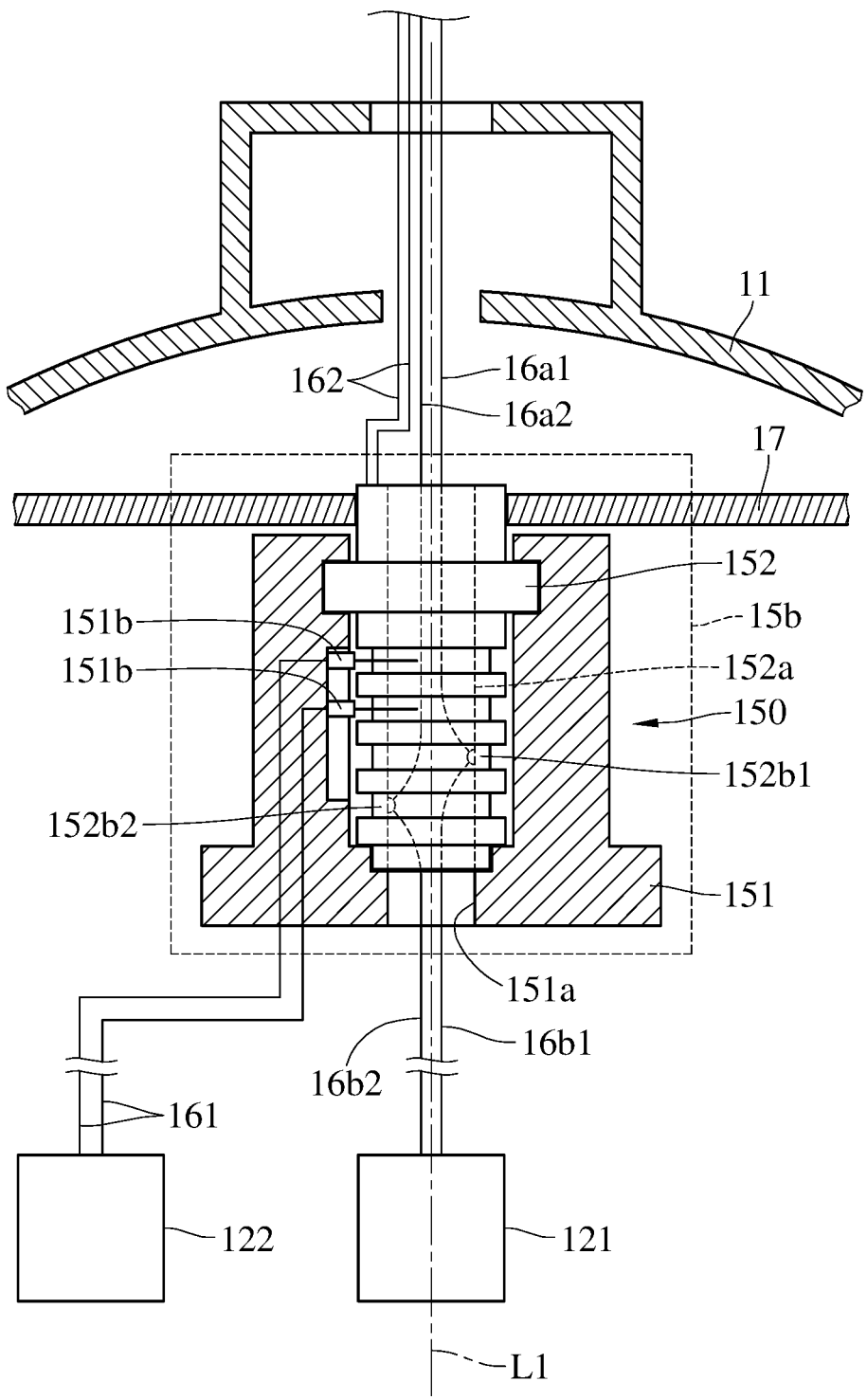
FIG. 2B is a cross-sectional side view of a connection assembly according to a second embodiment of the disclosure.

Please refer to FIG. 2B, which is a cross-sectional side view of a connection assembly 15b according to a second embodiment of the disclosure. In addition to utilizing connection assembly 15a shown in FIG. 2A, the photographing device 10 may utilize a connection assembly 15b in this embodiment. The first connection component 151 of the connection assembly 15b includes four brushes 151b, and the second connection component 152 includes four current collectors 152b. Two of the current collectors 152b are provided for two of the cables 161. A cable 16a1 of the cables 161 located between the main body 11 and the connection assembly 15b is electrically connected to a current collector 152b1 via the second through hole 152a of the second connection component 152. A cable 16a2 of the cables 161 is electrically connected to a current collector 152b2 via the second through hole 152a of the second connection component 152. A cable 16b1 of the cables 161 located between the first video capturing unit 121 and the connection assembly 15b is electrically connected to a current collector 152b1 via the second through hole 152a of the second connection component 152. A cable 16b2 of the cables 161 is also electrically connected to a current collector 152b2 of the second connection component 152 via the second through hole 152a of the second connection component 152. The above-mentioned method for connection is herein defined as an additional pair-of-current-collector-and-brush connection method. Since the second connection component 152 is fixed by the fixation bracket 17, the cables 16a1, 16a2, 16b1 and 16b2 and the first video capturing unit 121 may not rotated accordingly along with the rotation of the first connection component 151.

Figure 2C:
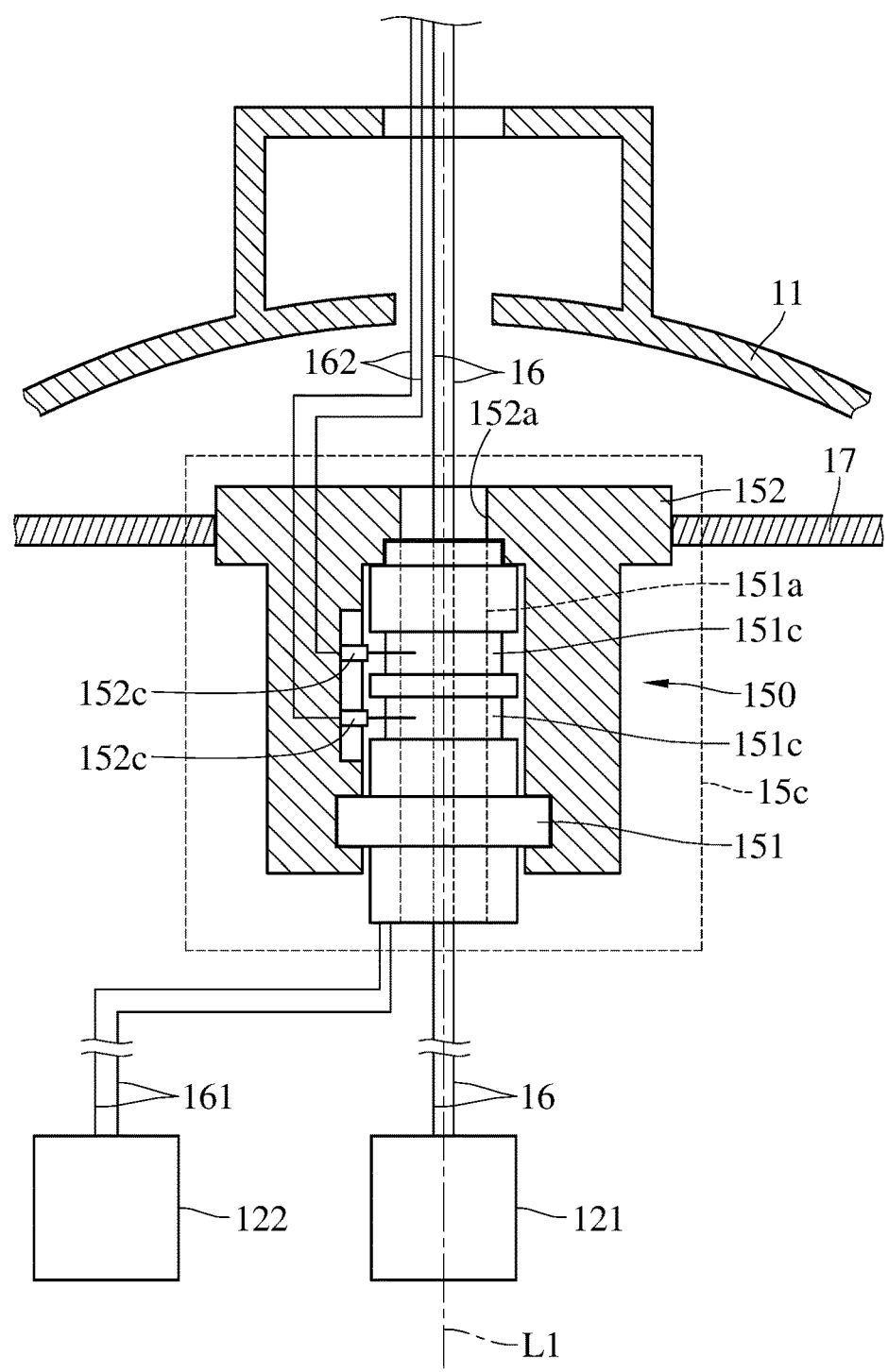
FIG. 2C is a cross-sectional side view of a connection assembly according to a third embodiment of the disclosure.

Please refer to FIG. 2C, which is a cross-sectional side view of a connection assembly 15c according to a third embodiment of the disclosure. In addition to utilizing the connection assembly 15a shown in FIG. 2A and the connection assembly 15b shown in FIG. 2B, the photographing device 10 may utilize the connection assembly 15c in this embodiment. The rotatable electrical connection portion 150 of the connection assembly 15c also includes a first connection component 151 and a second connection component 152 that are pivoted and electrically connected to each other. The first connection component 151 is pivotally disposed on the second connection component 152 for being rotatable about the first axis L1.

However, in this embodiment, the first connection component 151 comprises a plurality of current collectors 151c, and the second connection component 152 comprises a plurality of brushes 152c. Some of the cables 161 electrically connected to the first connection component 151 and the second video capturing unit 122 are electrically connected to the current collectors 151c of the first connection component 151 through interior wires of the first connection component 151, respectively. Some other cables 162 electrically connected to the second connection component 152 and the main body 11 are electrically connected to the brushes 152c of the second connection component 152, respectively. The first connection component 151 and the second connection component 152 are in electrical contact with each other. Because the current collectors 151c and the brushes 152c are in direct contact with each other, when rotating about the first axis L1 with the second video capturing unit 122, the first connection component 151 is still electrically connected to the second connection component 152. According to the above-mentioned configuration, the first video capturing unit 121 is electrically connected to the main body 11 via the cables 16 penetrating through the first through hole 151a of the first connection component 151 and the second through hole 152a of the second connection component 152. Moreover, the second video capturing unit 122 is electrically connected to the main body 11 via the connection of the current collectors 151c of the first connection component 151 and the brushes 152c of the second connection component 152. Since the cable 16 is not in contact with the connection assembly 15b, both of the cables 16 and the first video capturing unit 121 may not be rotated accordingly with the rotation of the first connection component 151. Moreover, the connection assembly 15b may include a housing which is affixed to the second connection component 152. The fixation bracket 17 is affixed to the housing of the connection assembly 15b. The connection assembly 15b may not be detached to fall because of the second connection component 152 being fixed by the fixation bracket 17. However, the disclosure is not limited to the above-mentioned fixation of the connection assembly 15b and the fixation bracket 17.

Figure 2D:
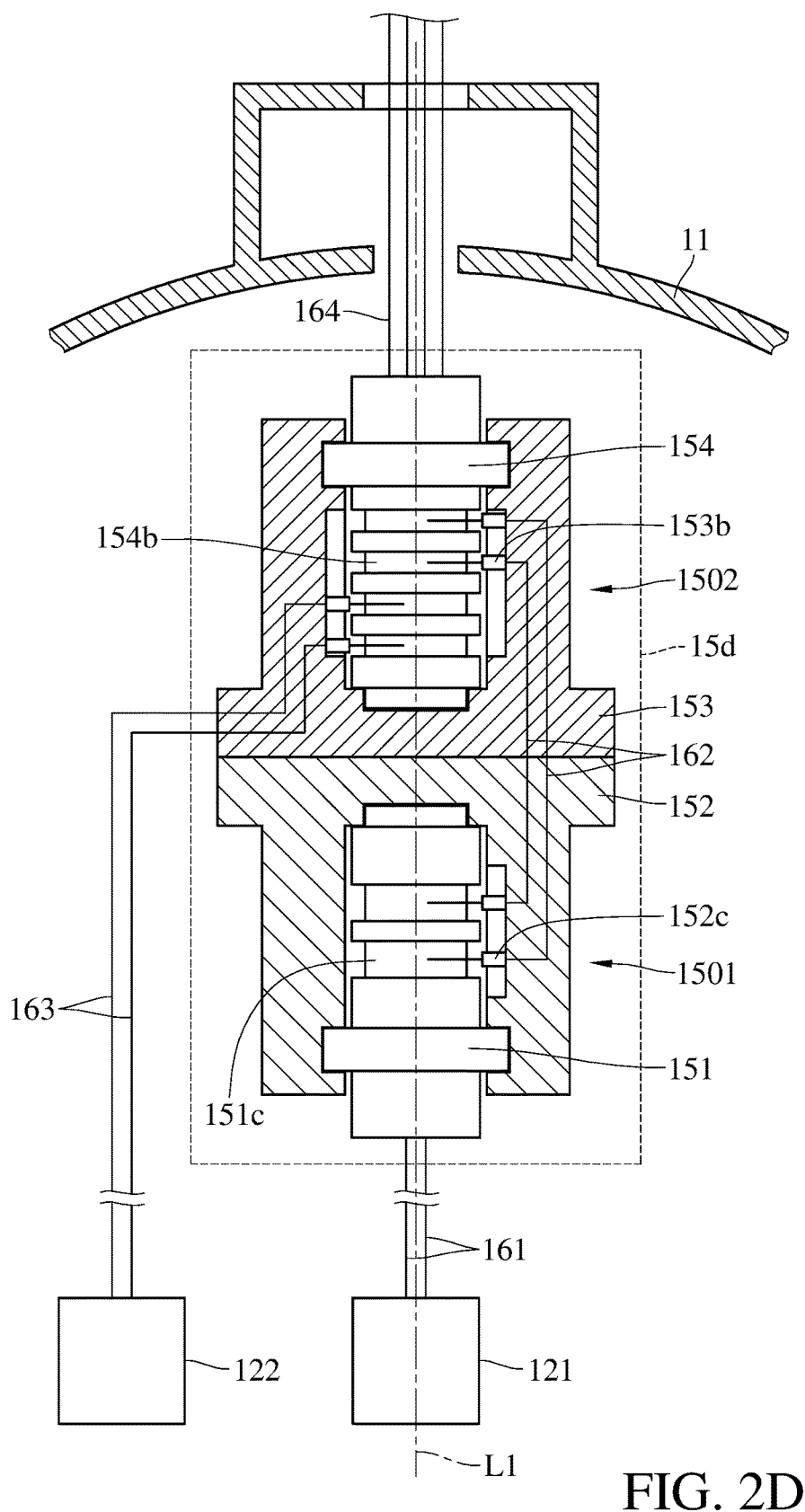
FIG. 2D is a cross-sectional side view of a connection assembly according to a fourth embodiment of the disclosure.

Please refer to FIG. 2D, which is a cross-sectional side view of a connection assembly 15d according to a fourth embodiment of the disclosure. In addition to utilizing the connection assemblies 15a, 15b and 15c, the photographing device 10 in this disclosure may utilize the connection assembly 15d in this embodiment. The connection assembly 15d includes a first rotatable electrical connection portion 1501 and a second rotatable electrical connection portion 1502. The first rotatable electrical connection portion 1501 includes a first connection component 151 and a second connection component 152 that are pivoted and electrically connected to each other. The second rotatable electrical connection portion 1502 includes a third connection component 153 and a fourth connection component 154 that are connected to each other. The third connection component 153 is pivotally disposed on the fourth connection component 154 for being rotatable about the first axis L1. The second connection component 152 is affixed and electrically connected to the third connection component 153. The second connection component 152 is pivotally disposed on the first connection component 151 for being rotatable about the first axis L1. The first video capturing unit 121 is disposed on and electrically connected to the first connection component 151. The second video capturing unit 122 is disposed on and electrically connected to the second connection component 152 or the third connection component 153. The fourth connection component 154 is disposed on and electrically connected to the main body 11.

The first connection component 151 comprises a plurality of current collectors 151c. The second connection component 152 comprises a plurality of brushes 152c. The third connection component 153 comprises a plurality of brushes 153b. The fourth connection component 154 comprises a plurality of current collectors 154b. Some of the cables 161 electrically connected to the first connection component 151 and the first video capturing unit 121 are electrically connected to the current collectors 151c of the first connection component 151, respectively. Two ends of some other cables 162 electrically connected to the second connection component 152 and the third connection component 153 are electrically connected to the brushes 152c of the second connection component 152 and the brushes 153b of the third connection component 153, respectively. Some other cables 163 electrically connected to the third connection component 153 (or the second connection component 152) and the second video capturing unit 122 are electrically connected to the brushes 153b of the third connection component 153 (or the brushes 152c of the second connection component 152), respectively. Some other cables 164 electrically connected to the fourth connection component 154 and the main body 11 are electrically connected to the current collector 154b of the fourth connection component 154.

The second connection component 152 and the third connection component 153 may rotate (i.e., spin) about first axis L1 along with the rotation of the second video capturing unit 122. Since the first connection component 151 is affixed to the main body 131 and the fourth connection component 154 is affixed to the fixation bracket 17 (not shown in FIG. 2D), the first connection component 151 and the fourth connection component 154 may not be rotated relative to the main body 11. However, the disclosure is not limited to the above-mentioned fixation relationship. Moreover, the third connection component 153 and the fourth connection component 154 are in electrical contact with each other via the connection of the brushes 153b and the current collectors 154b, such that when the third connection component 153 rotates about the first axis L1 along with the second video capturing unit 122, the third connection component 153 may still be electrically connected to the fourth connection component 154. The first connection component 151 and the second connection component 152 is in electrical contact with each other via the electrical connections of the current collectors 151c and the brushes 152c, such that when the second connection component 152 rotates about the first axis L1 along with the second video capturing unit 122, the second connection component 152 may still be electrically connected to the first connection component 151.

According to the above-mentioned configuration, the first video capturing unit 121 is capable of being electrically connected to the main body 11 via the electrical connections of the current collectors 151c of the first connection component 151 and the brushes 152c of the second connection component 152, the electrical connections of the second connection component 152 and the third connection component 153, the electrical connections of the brushes 153b of the third connection component 153 and the current collectors 154b of the fourth connection component 154, and the electrical connections of the fourth connection component 154 and the main body 11 in sequence. Furthermore, the second video capturing unit 122 is capable of being electrically connected to the main body 11 via the electrical connections of the brushes 153b of the third connection component 153 and the current collectors 154b of the fourth connection component 154.

In addition to connecting each current collector 151c of the first connection component 151 shown in FIGS. 2A, 2B and 2C (not shown in FIG. 2D), the cable 161 may directly connected to the main body 11. Furthermore, under the circumstances that there are several through holes, the additional pair-of-current-collector-and-brush connection method described above may be also utilized to allow the cable 161 to connect the unused the current collector 151c or allow the cable 164 to connect the unused current collector 154b.

Figure 2E:
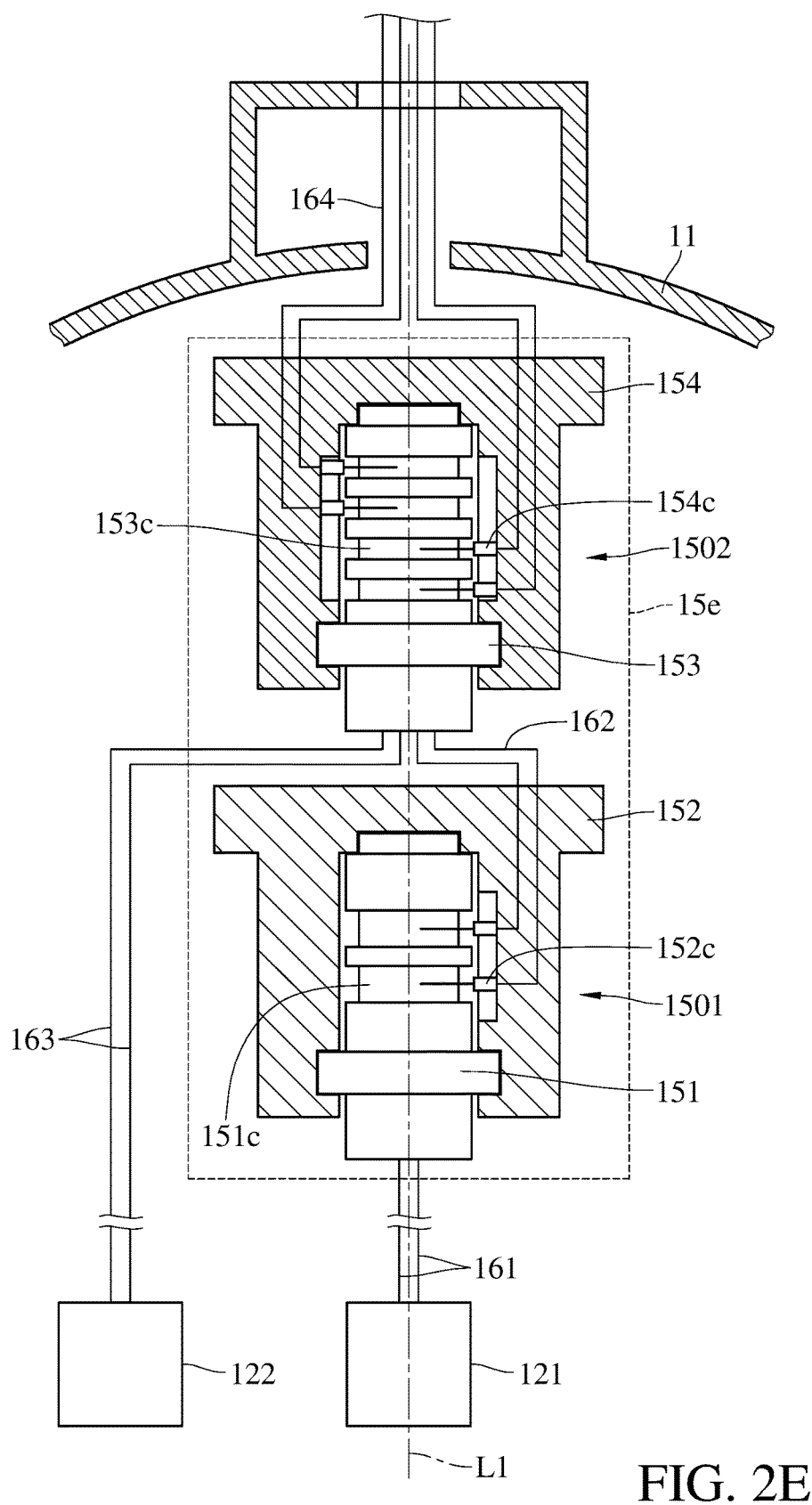
FIG. 2E is a cross-sectional side view of a connection assembly according to a fifth embodiment of the disclosure.

Please refer to FIG. 2E, which is a cross-sectional side view of a connection assembly 15e according to a fifth embodiment of the disclosure. In addition to utilizing the connection assemblies 15a, 15b, 15c and 15d in this disclosure, the photographing device 10 in this disclosure may utilize the connection assembly 15e disclosed in this embodiment. The first rotatable electrical connection portion 1501 of the connection assembly 15e includes a first connection component 151 and a second connection component 152 that are pivoted and electrically connected to each other. The second rotatable electrical connection portion 1502 includes a third connection component 153 and a fourth connection component 154 that are pivoted to and electrically connected to each other. The third connection component 153 is pivotally disposed on the fourth connection component 154 for being rotatable about the first axis L1. The second connection component 152 is affixed and electrically connected to the third connection component 153. The second connection component 152 is pivotally disposed on the first connection component 151 for being rotatable about the first axis L1.

Furthermore, in this embodiment, the first connection component 151 comprises a plurality of current collectors 151c. The second connection component 152 comprises a plurality of brushes 152c. The third connection component 153 comprises a plurality of current collectors 153c. The fourth connection component 154 comprises a plurality of brushes 154c. Some of the cables 161 electrically connected to the first connection component 151 and the first video capturing unit 121 are electrically connected to the current collectors 151c of the first connection component 151, respectively. Two ends of some other cables 162 electrically connected to the second connection component 152 and the third connection component 153 are electrically connected to the brushes 152c of the second connection component 152 and the current collectors 153c of the third connection component 153, respectively. Some other cables 163 electrically connected to the third connection component 153 and the second video capturing unit 122 are electrically connected to the current collectors 153c of the third connection component 153, respectively. In other embodiments, which are not shown in FIG. 2E, the second connection component 152 may be electrically connected to the third connection component 153, and the cable 163 of the second video capturing unit 122 may be electrically connected to the second connection component 152, and the cable 163 may be electrically connected to the third connection component 153 via the second connection component 152. Alternatively, the cable 163 may be electrically connected to a node (i.e., joint) between the second connection component 152 and the third connection component 153. Other cables 164 electrically connected to fourth connection component 154 and the main body 11 are electrically connected to the brushes 154c of the fourth connection component 154.

The third connection component 153 and the fourth connection component 154 are in electrical contact with each other via the connections of the current collectors 153c and brushes 154c, such that when the third connection component 153 rotates about the first axis L1 along with the second video capturing unit 122, the third connection component 153 may still be electrically connected to the fourth connection component 154. The first connection component 151 and the second connection component 152 are in electrical contact with each other via the connections of the current collectors 151c and the brushes 152c, such that when the second connection component 152 rotates about the first axis L1 along with the second video capturing unit 122, the second connection component 152 may still be electrically connected to the first connection component 151. Since the first connection component 151 is affixed to the main body 131 and the fourth connection component 154 is affixed to the fixation bracket 17 (not shown in FIG. 2E), both of the first connection component 151 and the fourth connection component 154 may not be rotated with the main body 11. However, the above-mentioned fixation relationship is not limited to the disclosure. Moreover, according to the above-mentioned configuration, the first video capturing unit 121 is capable of being electrically connected to the main body 11 via the electrical connections of the current collectors 151c of the first connection component 151 and the brushes 152c of the second connection component 152, the electrical connections of the second connection component 152 and the third connection component 153, the electrical connections of the current collectors 153c of the third connection component 153 and the brushes 154c of the fourth connection component 154, and the electrical connections of the fourth connection component 154 and the main body 11 in sequence. The second video capturing unit 122 is capable of being electrically connected to the main body 11 via the current collectors 153c of the third connection component 153 and the brushes 154c of the fourth connection component 154.

In addition to connecting the current collectors 151c of the first connection component 151, the cables 161 may still be directly and electrically connected to the main body 11 via the through holes shown in FIGS. 2A, 2B and 2C (not shown in FIG. 2E).

Figure 2F:
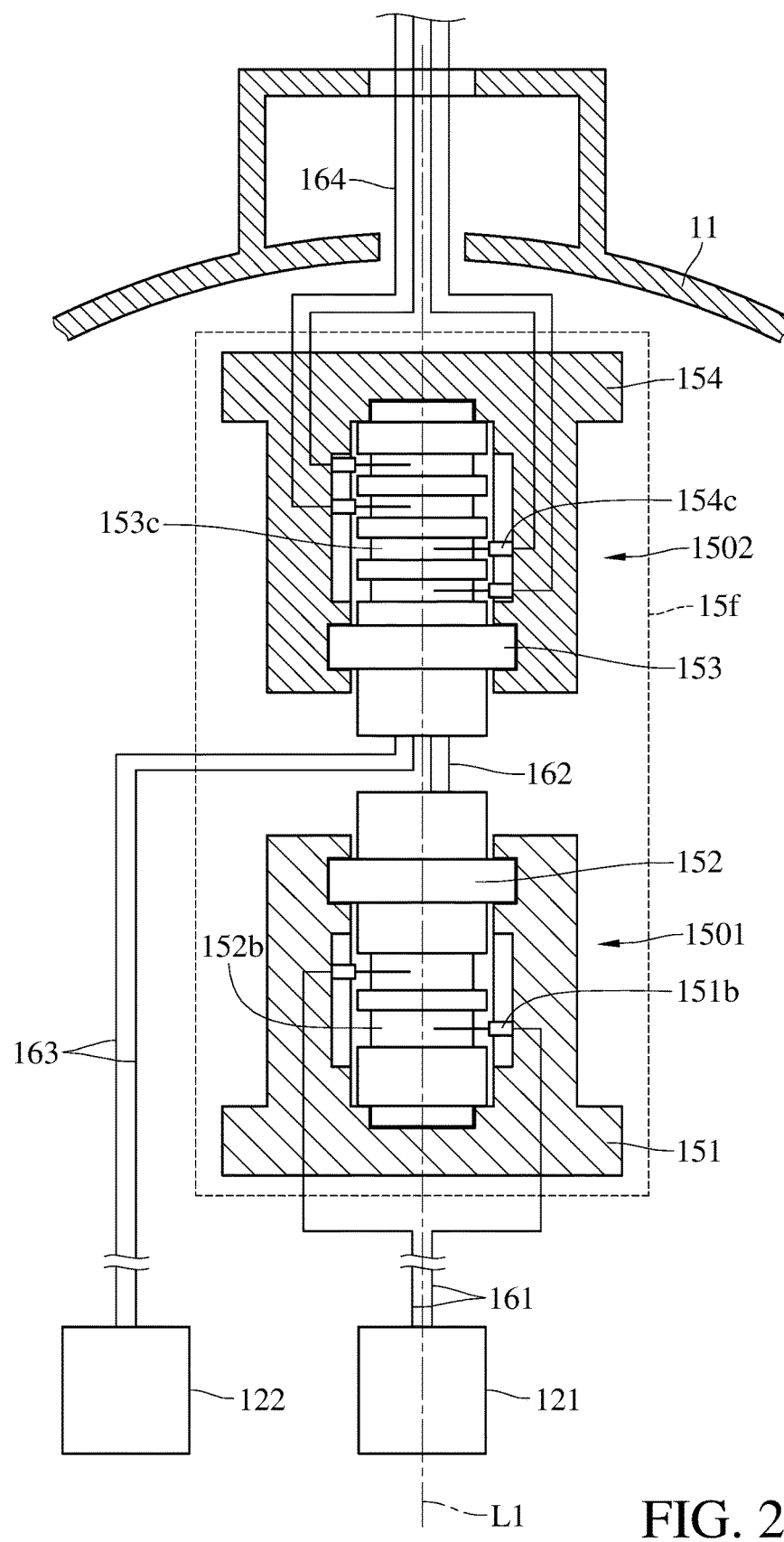
FIG. 2F is a cross-sectional side view of a connection assembly according to a sixth embodiment of the disclosure.

Please refer to FIG. 2F, which is a cross-sectional side view of a connection assembly 15f according to a sixth embodiment of the disclosure. In addition to utilizing the above-mentioned connection assemblies 15, 15b, 15c, 15d and 15e, the photographing device 10 may also utilize the connection assembly 15f disclosed in this embodiment. The first rotatable electrical connection portion 1501 of the connection assembly 15f includes a first connection component 151 and a second connection component 152 that are pivoted and electrically connected to each other. The second rotatable electrical connection portion 1502 includes a third connection component 153 and a fourth connection component 154 that are pivoted and electrically connected to each other. The third connection component 153 is pivotally disposed on the fourth connection component 154 for being rotatable about the first axis L1. The second connection component 152 is affixed and electrically connected to the third connection component 153. The second connection component 152 is pivotally disposed on the first connection component 151 for being rotatable about the first axis L1.

In this embodiment, the first connection component 151 comprises a plurality of brushes 151b. The second connection component 152 comprises a plurality of current collectors 152b. The third connection component 153 comprises a plurality of current collectors 153c. The fourth connection component 154 comprises a plurality of brushes 154c. Some cables 161 electrically connected to the first connection component 151 and the first video capturing unit 121 are electrically connected to the brushes 151b of the first connection component 151, respectively. Two ends of some other cables 162 electrically connected to the second connection component 152 and the third connection component 153 are electrically connected to the current collectors 152b of the second connection component 152 and the current collectors 153c of the third connection component 153, respectively. Some other cables 163 electrically connected to the third connection component 153 and the second video capturing unit 122 are electrically connected to the current collector 153c of the third connection component 153, respectively. In other embodiments, which are not shown in FIG. 2F, the second connection component 152 may also be electrically connected to the third connection component 153, and the cables 163 connected to the second video capturing unit 122 are also electrically connected to second connection component 152, and the cables 163 are electrically connected to the third connection component 153 via the second connection component 152. Alternatively, the cables 163 may be electrically connected to nodes between the second connection component 152 and the third connection component 153. Some other cables 164 electrically connected to the fourth connection component 154 and the main body 11 are electrically connected to the brushes 154c of the fourth connection component 154, respectively.

The third connection component 153 and the fourth connection component 154 are in electrical contact with each other via the connections of the current collectors 153c and the brushes 154c, such that when the third connection component 153 rotates about the first axis L1 along with the second video capturing unit 122, the third connection component 153 may still be electrically connected to the fourth connection component 154. The first connection component 151 and the second connection component 152 are in electrical contact with each other via the connections of the brushes 151b and the current collectors 152b, such that when the second connection component 152 rotates about the first axis L1 with the second video capturing unit 122, the second connection component 152 may still be electrically connected to the first connection component 151. Since the first connection component 151 is affixed to the main body 131 as well as the fourth connection component 154 is affixed to the fixation bracket 17 (not shown in FIG. 2F), the first connection component 151 and the fourth connection component 154 may not be rotated relative to the main body 11. However, the disclosure is not limited to the above-mentioned fixation relationship. According to the above-mentioned configuration, the first video capturing unit 121 is capable of being electrically connected to the main body 11 via the electrical connections of the brushes 151b of the first connection component 151 and the current collectors 152b of the second connection component 152, the electrical connection of the second connection component 152 and the third connection component 153, the electrical connections of current collectors 153c of the third connection component 153 and the brushes 154c of the fourth connection component 154, and the electrical connection of the fourth connection component 154 and the main body 11 in sequence. Moreover, the second video capturing unit 122 is capable of being electrically connected to the main body 11 via the electrical connections of the current collectors 153c of the third connection component 153 and the brushes 154c of the fourth connection component 154.

In addition to connecting each brush 151b of the first connection component 151, the cable 161 may be electrically connected to the main body 11 via the through holes shown in FIGS. 2A, 2B and 2C (not shown in FIG. 2F).

Figure 2G:
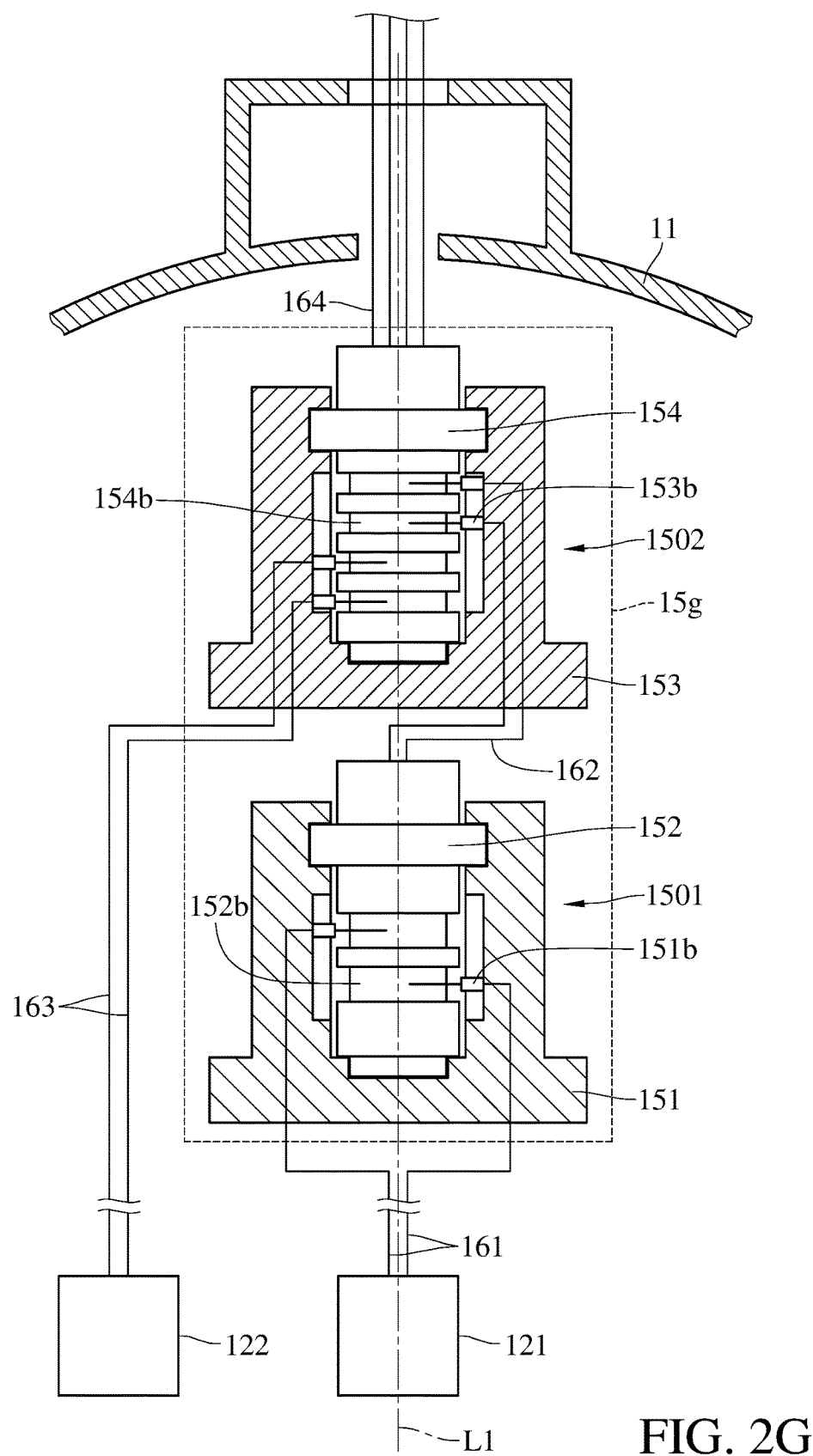
FIG. 2G is a cross-sectional side view of a connection assembly according to a seventh embodiment of the disclosure.

Please refer to FIG. 2G, which is a cross-sectional side view of a connection assembly 15g according to a seventh embodiment of the disclosure. In addition to utilizing the connection assemblies 15a, 15b, 15c, 15d, 15e and 15f, the photographing device 10 in this disclosure may utilize the connection assembly 15g disclosed in this embodiment. The first rotatable electrical connection portion 1501 of the connection assembly 15g includes a first connection component 151 and a second connection component 152 that are pivoted and electrically connected to each other. The second rotatable electrical connection portion 1502 includes a third connection component 153 and a fourth connection component 154 that are pivoted and electrically connected to each other. The third connection component 153 is pivotally disposed on the fourth connection component 154 for being rotatable about the first axis L1. The second connection component 152 is affixed and electrically connected to the third connection component 153. The second connection component 152 is pivotally disposed on the first connection component 151 for being rotatable about the first axis L1.

In this embodiment, the first connection component 151 comprises a plurality of brushes 151b. The second connection component 152 comprises a plurality of current collectors 152b. The third connection component 153 comprises a plurality of brushes 153b. The fourth connection component 154 comprises a plurality of current collectors 154b. Some cables 161 electrically connected to the first connection component 151 and the first video capturing unit 121 are electrically connected to the brush 151b of the first connection component 151, respectively. Two ends of some other cables 162 electrically connected to the second connection component 152 and the third connection component 153 are electrically connected to the current collector 152 of the second connection component 152 and the brushes 153b of the third connection component 153, respectively. Some other cables 163 electrically connected to the third connection component 153 and the second video capturing unit 122 are electrically connected to the brushes 153b of the third connection component 153. In other embodiments, which are not shown in FIG. 2G, the second connection component 152 may also be electrically connected to the third connection component 153, and some other cables 163 connected to the second video capturing unit 122 may also be electrically connected to the second connection component 152, and the second connection component 152 may also be electrically connected to the third connection component 153 via the second connection component 152. Alternatively, the cables 163 may be electrically connected to a node between the second connection component 152 and the third connection component 153. Some other cables 164 electrically connected to the fourth connection component 154 and the main body 11 are electrically connected to the current collectors 154b of the fourth connection component 154.

The third connection component 153 and the fourth connection component 154 are in electrical contact with each other via the electrical connections of the brushes 153b and the current collectors 154b, such that when the third connection component 153 rotates about the first axis L1 along with the second video capturing unit 122, the third connection component 153 may still be electrically connected to the fourth connection component 154. The first connection component 151 and the second connection component 152 are in electrical contact with each other via the electrical connections of the brushes 151b and the current collectors 152b, such that when the second connection component 152 rotates about the first axis L1 along with the second video capturing unit 122, the second connection component 152 may still be electrically connected to the first connection component 151. Since the first connection component 151 is affixed to the main body 131 and the fourth connection component 154 is affixed to the fixation bracket 17 (not shown in FIG. 2G), both of the first connection component 151 and the fourth connection component 154 may not be rotated relative to the main body 11. However, the disclosure is not limited to the above-mentioned fixation relationship. Moreover, according to the above-mentioned configuration, the first video capturing unit 121 is capable of being electrically connected to the main body 11 via the electrical connections of the brush 151b of the first connection component 151 and the current collectors 152b of the second connection component 152, the electrical connection of the second connection component 152 and the third connection component 153, the electrical connections of the brushes 153b of the third connection component 153 and the current collectors 154b of the fourth connection component 154, and the electrical connection of the fourth connection component 154 and the main body 11 in sequence. Nevertheless, the second video capturing unit 122 is capable of being electrically connected to the main body 11 via the electrical connections of the brushes 153b of the third connection component 153 and the current collectors 154b of the fourth connection component 154.

In addition to connecting the above-mentioned brushes 151b of the first connection component 151, the cables 161 may be further directly connected to the main body 11 via the through holes shown in FIGS. 2A, 2B and 2C (not shown in FIG. 2G).

Figure 3:
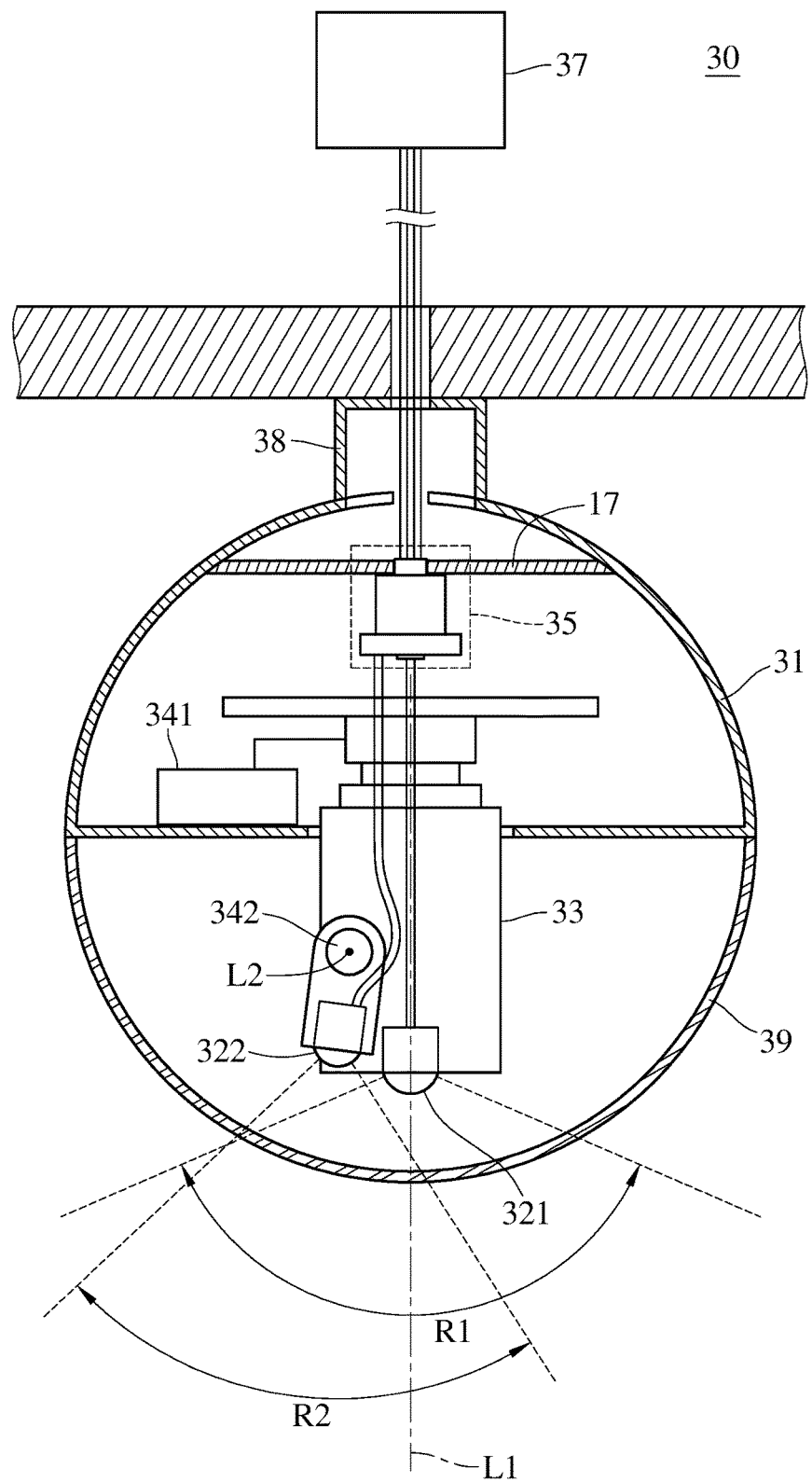
FIG. 3 is a cross-sectional side view of a photographing device according to an eighth embodiment of the disclosure.

Please refer to FIG. 3, which is a cross-sectional side view of a photographing device 30 according to an eighth embodiment of the disclosure. In this embodiment, the photographing device 30 comprises a main body 31, a first video capturing unit 321, a second video capturing unit 322, a holder 33, a first driving module 341, a second driving module 342, a connection assembly 35, an installation component 38 and a shield 39. Moreover, the photographing device 30 further comprises an image processing module 37. However, the difference between this embodiment and the first embodiment shown in FIG. 1 is that the fixation bracket 17 is not used for fixing the first video capturing unit 321 and the main body 31 to allow them to not rotate relatively. The detailed operation will be described as follows.

In this embodiment, the first video capturing unit 321 is pivotally disposed on the main body 31 about the first axis L1. The connection assembly 35 is located on the first axis L1. The first video capturing unit 321 and the second video capturing unit 322 are electrically connected to each other via the connection assembly 35 and the main body 31. The image processing module 37 is electrically connected to the first video capturing unit 321 and the second video capturing unit 322 via the connection assembly 35. The image processing module 37 is capable of processing an image captured by the first video capturing unit 321 after rotation into a fixed-angle image (an image with fixed viewing angle).

The first video capturing unit 321 captures a fixed-angle baseline image at a baseline location, and let the coordinate of a certain point (x0, y0). After the first video capturing unit 321 rotates by an angle θ, let the coordinate of the certain point in a captured rotational image (x, y). The image processing module 37 utilizes a transformation matrix:

$$R = \begin{bmatrix} \cos\theta & -\sin\theta \\ \sin\theta & \cos\theta \end{bmatrix}$$

to calculate $$\begin{bmatrix} x' \\ y' \end{bmatrix} = \begin{bmatrix} \cos\theta & -\sin\theta \\ \sin\theta & \cos\theta \end{bmatrix} \begin{bmatrix} x \\ y \end{bmatrix} = \begin{bmatrix} x0 \\ y0 \end{bmatrix}$$

wherein values of angle θ and each (x,y) are known.

Therefore, each (x0,y0) corresponding to (x,y) is obtained. Then, formula x'=x cos θ−y sin θ=x0 and y'=x sin θ+y cos θ=y0 are derived from the above-mentioned matrix. Therefore, after the rotational image is transformed by the image processing module 37, the viewing angle of the transformed rotational image is the same as the fixed-angle baseline image. No matter the rotational angles of the first video capturing unit 321 are, the viewing angle of the transformed image may still be maintained.

Figure 4A:
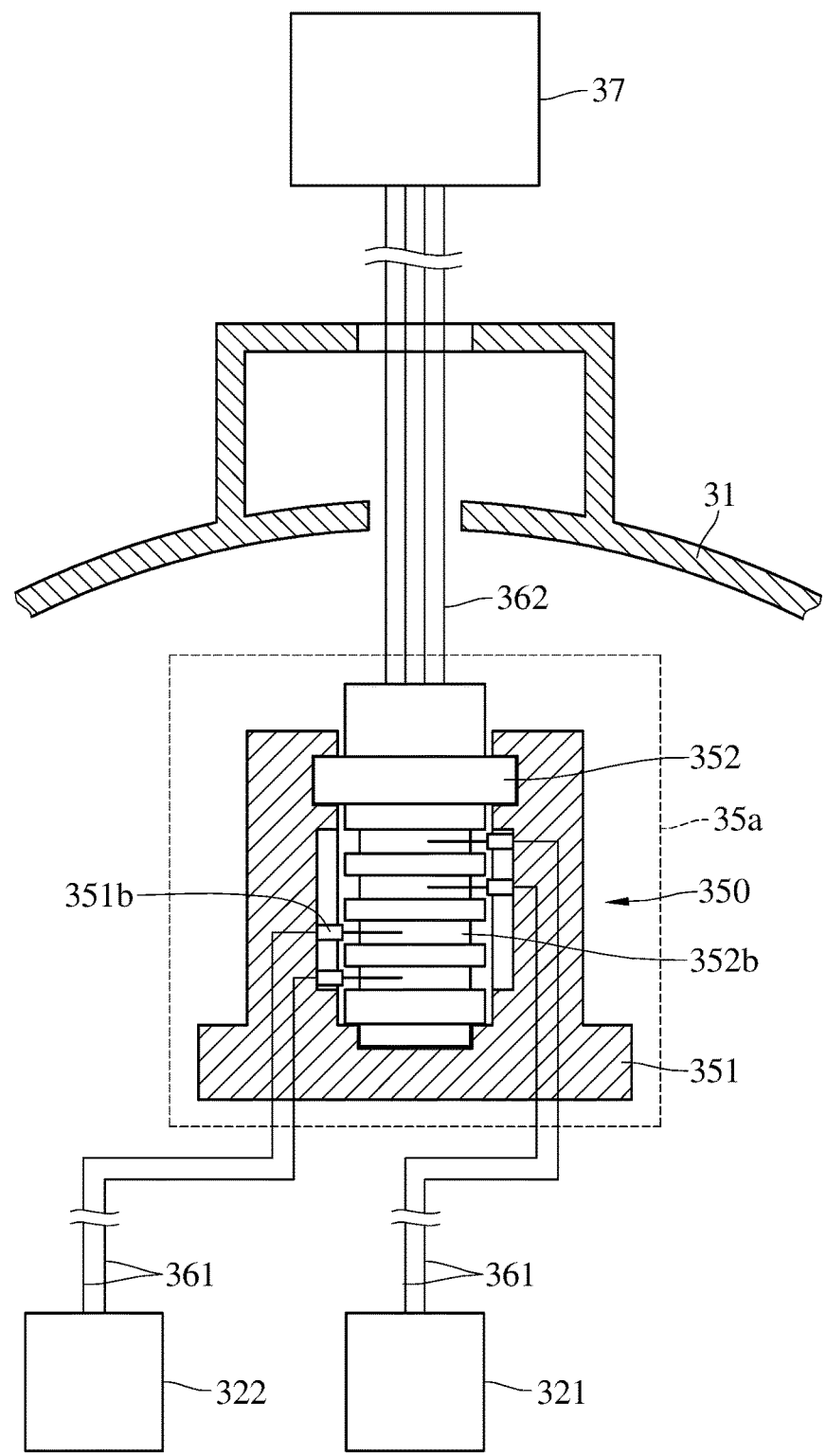
FIG. 4A is a cross-sectional side view of a connection assembly of the photographing device in FIG. 3 according to a ninth embodiment of the disclosure.

Please refer to FIG. 4A, which is a cross-sectional side view of a connection assembly 35a of the photographing device in FIG. 3 according to a ninth embodiment of the disclosure. In this embodiment, the connection assembly 35a comprises a rotatable electrical connection portion 350. The rotatable electrical connection portion 350 includes a first connection component 351 and a second connection component 352 that are pivoted and electrically connected to each other. The first connection component 351 is pivotally disposed on the second connection component 352 for being rotatable about the first axis L1. Both of the first video capturing unit 321 and the second video capturing unit 322 are disposed on and electrically connected to the first connection component 351. The second connection component 352 is disposed on and electrically connected to the main body 31.

The first connection component 351 comprises a plurality of brushes 351b, the second connection component 352 comprises a plurality of current collectors 352b. Some cables 361 electrically connected to first connection component 351 and the first video capturing unit 321 as well as electrically connected to the first connection component 351 and the second video capturing unit 322 are electrically connected to the brushes 351b of the first connection component 351. Some other cable 362 electrically connected to the second connection component 352 and the main body 31 are electrically connected to the current collectors 352b of the second connection component 352, respectively. The first connection component 351 rotates about the first axis L1 along with both of first video capturing unit 321 and the second video capturing unit 322. Since the second connection component 352 is affixed to the fixation bracket 17 (not shown in FIG. 4A), the second connection component 352 may not be rotated along with the rotation of the first connection component 351, which prevents the cable 362 from being snapped. The first connection component 351 and the second connection component 352 are in electrical contact with each other via the electrical connections of brushes 351b and the current collector 352b. Therefore, when the first connection component 351 rotates about the first axis L1 along with the first video capturing unit 321 and the second video capturing unit 322, the first connection component 351 may still be electrically connected to the second connection component 352. According to the above-mentioned configuration, both of the first video capturing unit 321 and the second video capturing unit 322 are electrically connected to the main body 31 via the electrical connections of the brushes 351b of the first connection component 351 and the current collectors 352b of the second connection component 352. The second driving module 342 in FIG. 3 is capable of being electrically connected to the main body 31 via the similar route of the first video capturing unit 321 and the second video capturing unit 322.

Figure 4B:
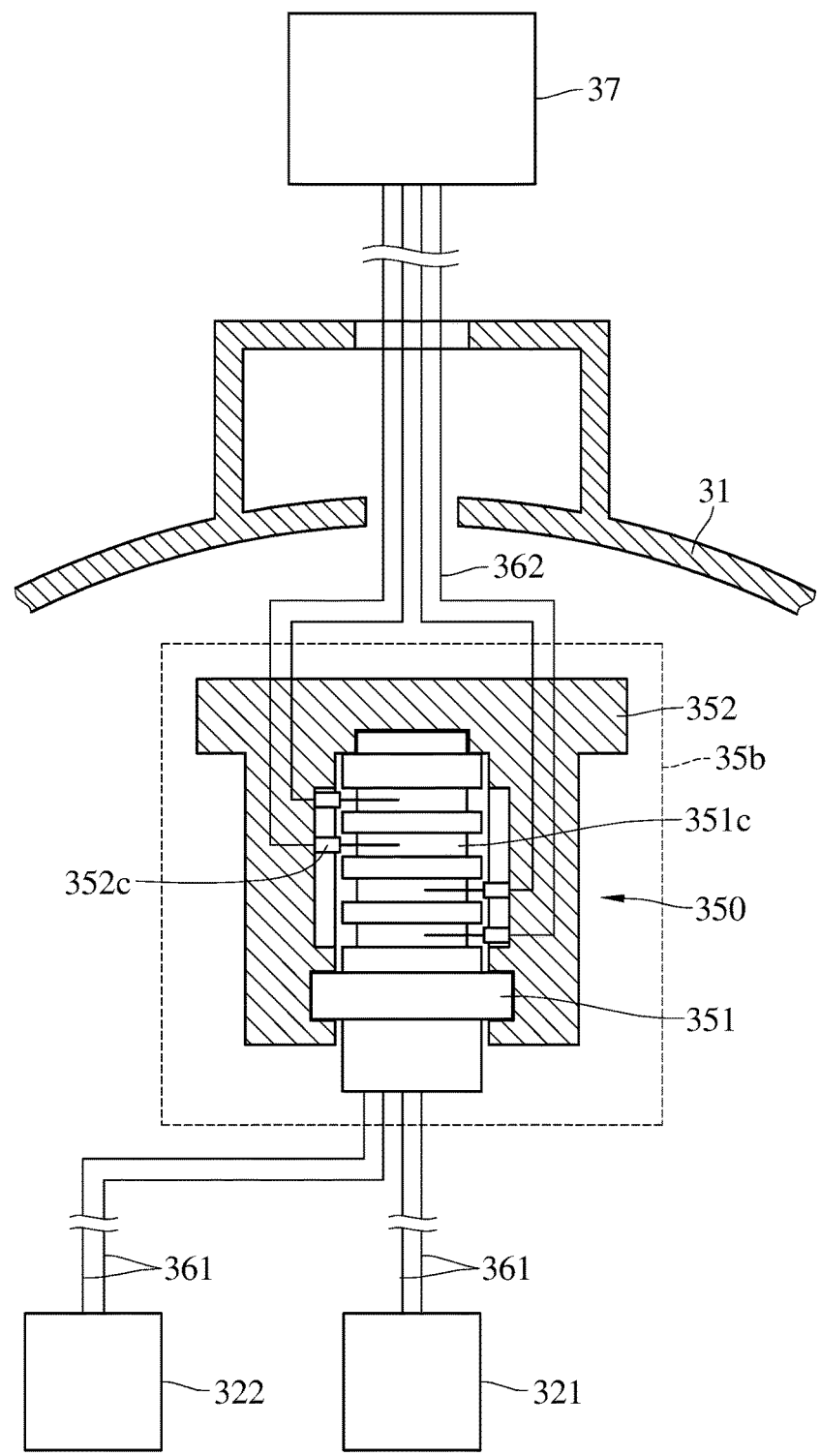
FIG. 4B is a cross-sectional side view of a connection assembly according to a tenth embodiment of the disclosure.

Please refer to FIG. 4B, which is a cross-sectional side view of a connection assembly 35b according to a tenth embodiment of the disclosure. In addition to utilizing the connection assembly 35a shown in FIG. 4A, the photographing device 30 may utilize the connection assembly 35b disclosed in this embodiment. In this embodiment, the rotatable electrical connection portion 350 of the connection assembly 35b also includes a first connection component 351 and a second connection component 352 that are pivoted and electrically connected to each other. The first connection component 351 is pivotally disposed on the second connection component 352 for being rotatable about the first axis L1. The second connection component 352 is affixed to the fixation bracket 17 (not shown in FIG. 4B), so that the second connection component 352 may not be rotated with the rotation of the first connection component 351, which prevents the cable 362 from being snapped.

In this embodiment, the first connection component 351 comprises a plurality of current collectors 351c. The second connection component 352 comprises a plurality of brushes 352c. The cables 361 which are electrically connected to the first connection component 351 and the first video capturing unit 321 as well as electrically connected to the first connection component 351 and the second video capturing unit 322 are electrically connected to current collectors 351c of the first connection component 351, respectively. The other cables 362 which are electrically connected to the second connection component 352 and the main body 31 are electrically connected to the brushes 352c of the second connection component 352.

The first connection component 351 and the second connection component 352 are in electrical contact with each other via the electrical connections of the current collectors 351c and the brushes 352c. Therefore, when the first connection component 351 rotates about the first axis L1 along with the first video capturing unit 321 and the second video capturing unit 322, the first connection component 351 may still be electrically connected to the second connection component 352. According to the above-mentioned configuration, the first video capturing unit 321 and the second video capturing unit 322 are electrically connected to the main body 31 via the electrical connections of the current collectors 351c of the first connection component 351 and the brushes 352c of the second connection component 352.

In addition to utilizing the configuration shown in the FIGS. 4A and 4B, the connection assembly shown in FIG. 3 may utilize two similar rotatable electrical connection portions shown in FIGS. 2D through 2G which are needed to be slightly revised. Specifically, the cable 161 shown in FIG. 2D is altered to be connected to the second connection component 152 or the third connection component 153 and capable of rotating along with them. The cable 161 shown in FIG. 2E is altered to be connected to the second connection component 152 or the third connection component 153 and capable of rotating along with them. The cable 161 shown in FIG. 2F is altered to be connected to the second connection component 152 or the third connection component 153 and capable of rotating along with them. The cable 161 shown in FIG. 2G is altered to be connected to the second connection component 152 or the third connection component 153 and capable of rotating along with them.

The photographing device may comprise a hose or a tube for covering and supporting the above-mentioned cables which are connected to the main body or the first video capturing unit.

Figure 1B:
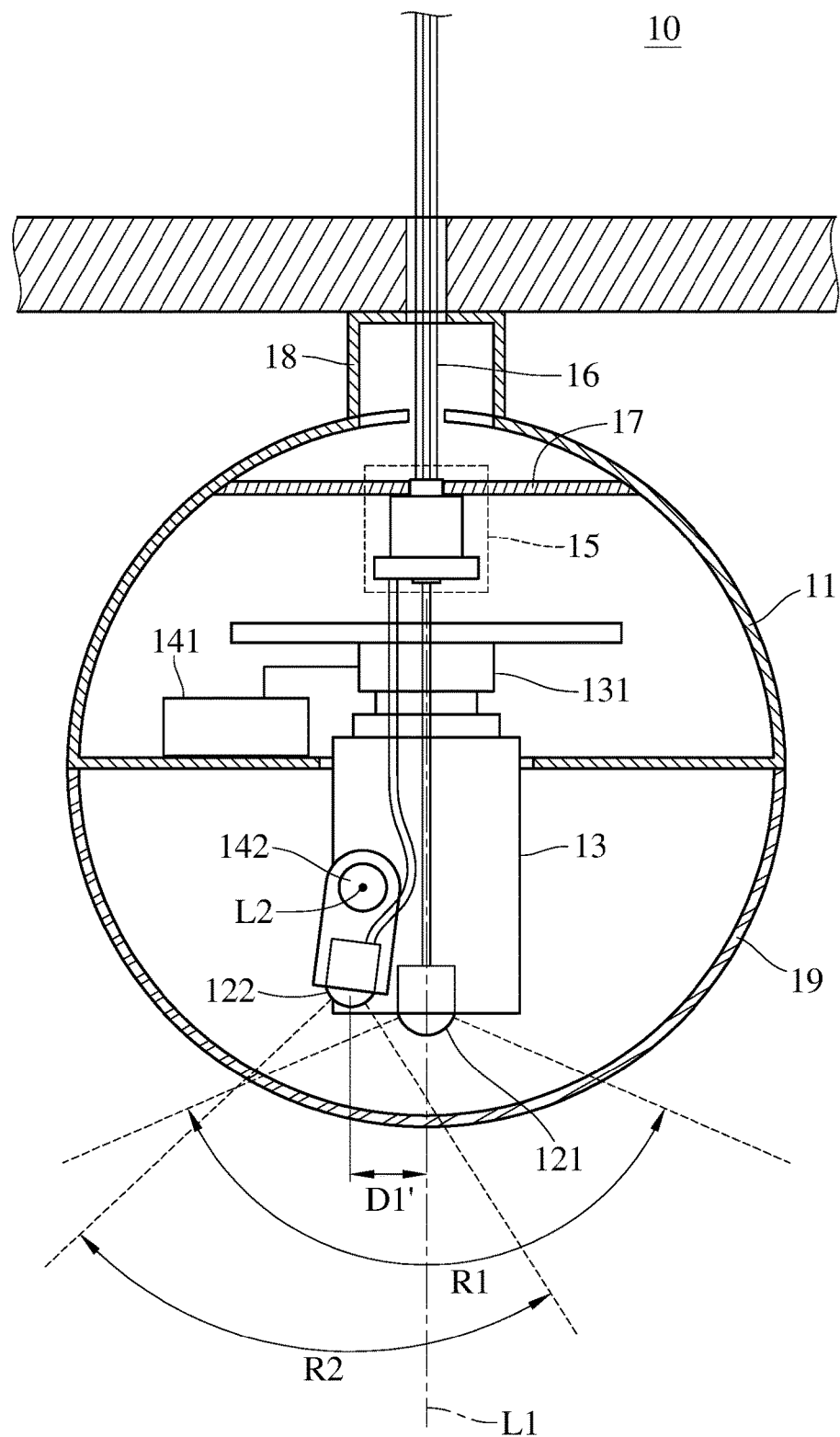
FIG. 1B is a cross-sectional side view of the photographing device in FIG. 1A when a second video capturing unit rotates.

Rest of the operation of the photographing device 30 shown in FIG. 3 is similar to those of the photographing device 10 shown in FIGS. 1A and 1B, and therefore the description of the similar operation will not be repeated herein again.

Figure 5:
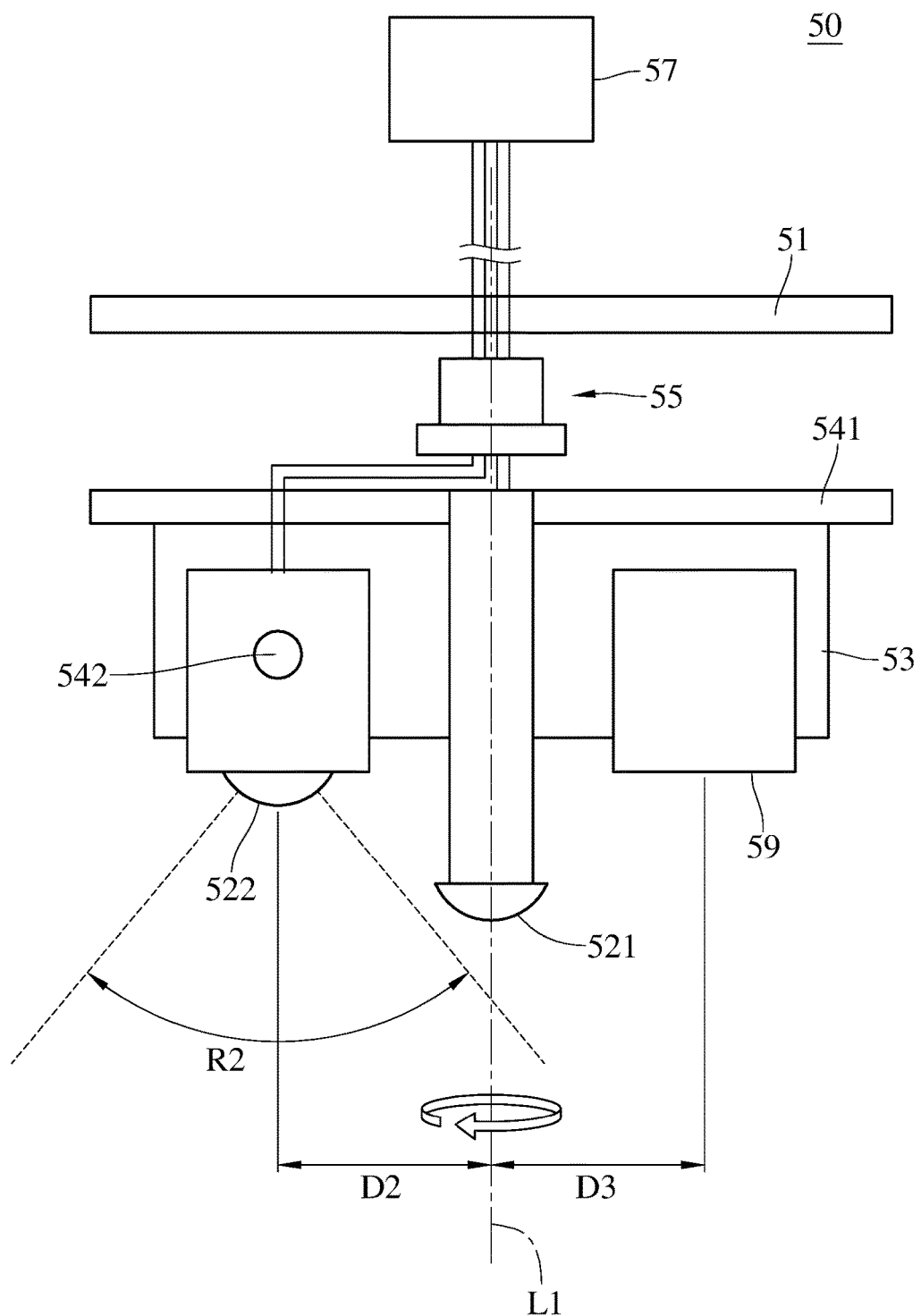
FIG. 5 is a cross-sectional side view of a photographing device according to an eleventh embodiment of the disclosure.

Please refer to FIG. 5, which is a cross-sectional side view of a photographing device 50 according to an eleventh embodiment of the disclosure. The photographing device 50, which is similar to the photographing device 30 shown in FIG. 3, comprises a main body 51, a first video capturing unit 521, a second video capturing unit 522, a holder 53, a first driving module 541, a second driving module 542, a connection assembly 55 and an image processing module 57. The structure of the connection assembly 55 may be similar to those of the connection assemblies 35a and 35b shown in FIGS. 4A and 4B.

Moreover, the structure of the connection assembly 55 may also be similar to those of the connection assemblies 15a, 15b, 15c, 15d, 15e, 15f and 15g shown in FIGS. 2A, 2B, 2C, 2D, 2E, 2F and 2G. Therefore, the image processing module 57 does not need to process to offset the image captured by the first video capturing unit 521 which is rotated.

In this embodiment, the photographing device 50 further comprises a weight balancer 59 which is disposed on the holder 53. The holder 53 is pivotally disposed on the main body 51 for being rotatable about the first axis L1. The weight balancer 59 and the second video capturing unit 522 are located at two opposite sides of the first axis L1. The mass of the weight balancer 59 is substantially the same as that of the second video capturing unit 522. The distance D2 between the center of the mass of the weight balancer 59 and the first axis L1 is substantially the same as the distance D3 between the center of the mass of the second video capturing unit 522 and the first axis L1.

Figure 6:
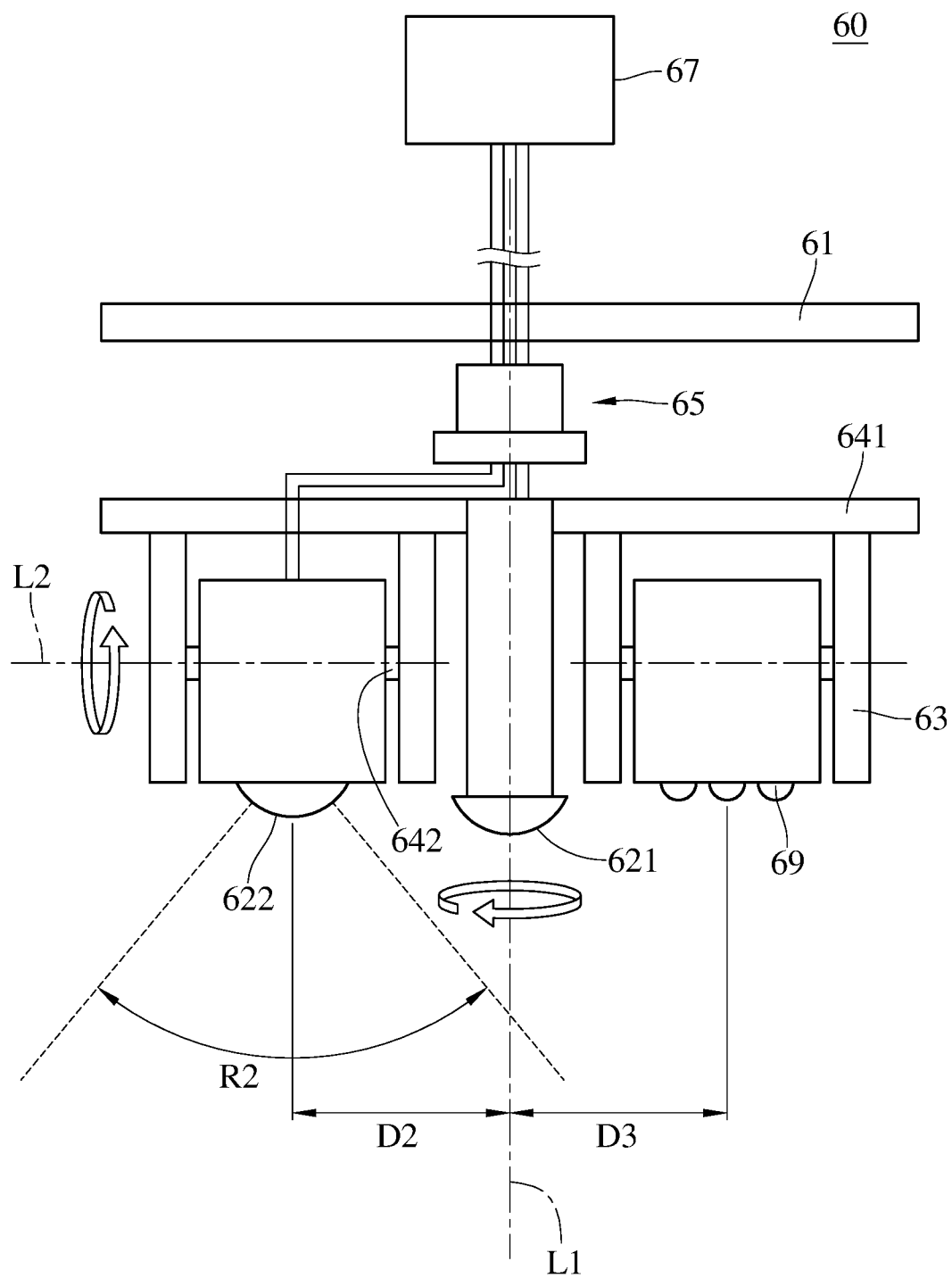
FIG. 6 is a cross-sectional side view of a photographing device according to a twelfth embodiment of the disclosure.

Please refer to FIG. 6, which is a cross-sectional side view of a photographing device 60 according to a twelfth embodiment of the disclosure. In this embodiment, the photographing device 60, which is similar to the photographing device 50 shown in FIG. 5, comprises a main body 61, a first video capturing unit 621, a second video capturing unit 622, a holder 63, a first driving module 641, a second driving module 642, a connection assembly 65 and an image processing module 67. The structure of the connection assembly 65 may be similar to those of the connection assemblies 35a and 35b shown in FIGS. 4A and 4B.

Moreover, the structure of connection assembly 65 may also be similar to those of the connection assemblies 15a, 15b, 15c, 15d, 15e, 15f and 15g shown in FIGS. 2A, 2B, 2C, 2D, 2E, 2F and 2G, and therefore the image processing module 67 does not need to process to offset the image captured by the first video capturing unit 521 which is rotated.

Furthermore, the photographing device 60 comprises an infrared module 69 pivotally disposed on the holder 63 for being rotatable about the second axis L2. The holder 63 is pivotally disposed on the main body 61 for being rotatable about the first axis L1. The direction of the first axis L1 is substantially perpendicular to the second axis L2. Also, the first axis L1 is interested with the second axis L2. The infrared module 69 and second video capturing unit 622 are disposed on two opposite sides of the first axis L1. The mass of the infrared module 69 is substantially the same as the mass of the second video capturing unit 622. The distance D2 between the center of the mass of the infrared module 69 and the first axis L1 is substantially equal to the distance D3 between the center of the mass of the second video capturing unit 622 and the first axis L1.

To sum up, according to the photographing device of the disclosure, the center of the first video capturing range of the first video capturing unit is located at the first axis, the second video capturing unit rotates about the first axis, and the second video capturing unit and the first axis are separated by a distance. Consequently, the second video capturing unit is located above the first video capturing unit but not on the upright position of the first video capturing unit, such that when the second video capturing unit captures an image below, the first video capturing unit may not obscure, block or interfere with the image capturing by the second video capturing unit. Thus, the image captured by the second video capturing unit does not have any blind spot.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

What is claimed is:

1. A photographing device, comprising:
   a main body;
   a first video capturing unit disposed on the main body, and a center of a first video capturing range of the first video capturing unit is substantially located on a first axis;
   a second video capturing unit pivotally disposed on the main body for being rotatable about the first axis, the second video capturing unit and the first axis being separated by a distance, and a second video capturing range of the second video capturing unit overlapping at least a portion of the first axis;
   a rotatable electrical connection portion including a first connection component and a second connection component that are pivoted and electrically connected to each other, the second video capturing unit being disposed on and electrically connected to the first connection component, and the second connection component being disposed on and electrically connected to the main body; and
   a holder pivotally disposed on the main body for being rotatable about the first axis, the second video capturing unit being pivotally disposed on the holder for being rotatable about a second axis, and the second video capturing unit also being pivotally disposed on the main body through the holder for being rotatable about the first axis.

2. The photographing device according to claim 1, wherein a direction of the first axis is substantially perpendicular to a direction of the second axis.

3. The photographing device according to claim 1, further comprising a driving module disposed on the second video capturing unit for driving the second video capturing unit to rotate about the second axis.

4. A photographing device, comprising:
   a main body;
   a first video capturing unit disposed on the main body, and a center of a first video capturing range of the first video capturing unit is substantially located on a first axis;
   a second video capturing unit pivotally disposed on the main body for being rotatable about the first axis, the second video capturing unit and the first axis being separated by a distance, and a second video capturing range of the second video capturing unit overlapping at least a portion of the first axis;
   a rotatable electrical connection portion including a first connection component and a second connection component that are pivoted and electrically connected to each other, the second video capturing unit being disposed on and electrically connected to the first connection component, and the second connection component being disposed on and electrically connected to the main body; and
   a weight balancer pivotally disposed on the main body for being rotatable about the first axis, and the weight balancer and the second video capturing unit being located at two opposite sides of the first axis.

5. The photographing device according to claim 4, wherein a mass of the weight balancer is substantially equal to a mass of the second video capturing unit, and a distance between a center of the mass of the weight balancer and the first axis is substantially equal to a distance between a center of the mass of the second video capturing unit and the first axis.

6. A photographing device, comprising:
   a main body;
   a first video capturing unit disposed on the main body, and a center of a first video capturing range of the first video capturing unit is substantially located on a first axis;
   a second video capturing unit pivotally disposed on the main body for being rotatable about the first axis, the second video capturing unit and the first axis being separated by a distance, and a second video capturing range of the second video capturing unit overlapping at least a portion of the first axis;
   a rotatable electrical connection portion including a first connection component and a second connection component that are pivoted and electrically connected to each other, the second video capturing unit being disposed on and electrically connected to the first connection component, and the second connection component being disposed on and electrically connected to the main body; and
   an infrared module pivotally disposed on the main body for being rotatable about the first axis, and the infrared module and the second video capturing unit are disposed on two opposite sides of the first axis.

7. The photographing device according to claim 6, wherein a mass of the infrared module is substantially equal to a mass of the second video capturing unit, and a distance between a center of the mass of the infrared module and the first axis is substantially equal to a distance between a center of the mass of the second video capturing unit and the first axis.

* * * * *